United States Patent
Guerinot et al.

[11] Patent Number: 5,979,979
[45] Date of Patent: Nov. 9, 1999

[54] VEHICLE SEAT FITTED WITH A SIDE-POSITIONED SAFETY AIRBAG

[75] Inventors: Thierry Guerinot, Etampes; Jérôme Senechal, Boynes, both of France

[73] Assignee: Bertrand Faure Equipements SA, Boulogne, France

[21] Appl. No.: 09/145,046

[22] Filed: Sep. 1, 1998

[30] Foreign Application Priority Data

Sep. 8, 1997 [FR] France .................................. 97 11135

[51] Int. Cl.$^6$ .................................. B60R 21/00
[52] U.S. Cl. .................................. 297/216.13; 297/216.1
[58] Field of Search .................................. 297/216.1, 216.13, 297/216.14, DIG. 3, 452.41, 452.38; 280/730.2, 728.3, 728.1

[56] References Cited

U.S. PATENT DOCUMENTS

| | | |
|---|---|---|
| 5,683,101 | 11/1997 | Davis et al. . |
| 5,797,621 | 8/1998 | Ono . |
| 5,799,970 | 9/1998 | Enders . |
| 5,803,490 | 9/1998 | Seventko et al. . |
| 5,816,660 | 10/1998 | Johnson, III et al. . |
| 5,826,946 | 10/1998 | Matthews et al. . |
| 5,839,752 | 11/1998 | Yamasaki et al. . |
| 5,845,966 | 12/1988 | Severinsky et al. . |

*Primary Examiner*—Milton Nelson, Jr.
*Attorney, Agent, or Firm*—Marshall, O'Toole, Gerstein, Murray & Borun

[57] ABSTRACT

This concerns a vehicle seat the back of which comprises a side-positioned safety airbag placed in a casing integrated into the seat back. The upholstery sleeve of the seat back comprises a cut out section placed to correspond with the casing front face, and the edge of the sleeve which borders the casing front face is engaged in a groove which surrounds this front face and which is integral with the casing.

2 Claims, 1 Drawing Sheet

VEHICLE SEAT FITTED WITH A SIDE-POSITIONED SAFETY AIRBAG

FIELD OF THE INVENTION

The present invention relates to vehicle seats fitted with side-positioned safety airbags.

More particularly, the invention concerns a vehicle seat comprising a seat back which includes padding supported by a rigid frame and covered by an upholstery sleeve, the seat back having a front face which is intended to act as a support for a user's back and two side edges which flank this front face, said seat back additionally comprising at least one airbag safety device which is adapted to inflate its bag by unfolding it at the user's side when the vehicle sustains a predetermined impact, the safety device being placed in a casing fitted with a peripheral side wall and with a front face adapted to open when the safety device bag inflates, this casing being integrated into the padding on one of the side edges of the seat back.

BACKGROUND OF THE INVENTION

In known seats of this type, the sleeve over the seat back completely covers the casing front face of the safety device, this sleeve being provided with a tearable seam corresponding said front face.

These known seats have the following drawbacks:

it may be difficult to accurately position the tearable seam of the sleeve in relation to the casing front face, since the sleeve completely covers the casing; if this positioning is badly done the safety device may malfunction or even not function at all in the event of the vehicle being involved in an accident, it is necessary to validate the correct operation of the safety device for each model of sleeve liable to cover the seat back, since the operation of said safety device requires the tearing of said sleeve: considering the great number of possible sleeve models for each vehicle model, this involves very numerous and expensive tests.

OBJECT AND SUMMARY OF THE INVENTION

The particular purpose of this invention is to overcome these drawbacks.

To this end, in accordance with the invention, the main feature of a seat of the type in question is that the upholstery sleeve comprises a cut out section delimited by an edge which belongs to said sleeve and which borders the casing front face of the safety device, with the result that this front face is visible on the side edge of the seat back, and in that the casing front face of the safety device is surrounded by a groove which is open at the side outwards from the seat back and which is integrated in the padding, the edge of the sleeve which borders the casing front face being engaged in said groove, and this edge being provided with means of retention which combine with additional means of retention provided in the groove to keep said edge in said groove.

As a result of these arrangements, problems of positioning the seat back sleeve are eliminated, and the correct operation of the safety device is independent of said sleeve, with the result that it is no longer necessary to validate the correct operation for each type of sleeve used.

In preferred versions of the invention, it may additionally be possible to use one and/or other of the following arrangements:

the groove which surrounds the casing front face is secured to said casing;

the groove which surrounds the casing front face is formed in a single piece with said casing;

the groove which surrounds the casing front face has approximately a U shaped section, with an external side wall, an internal side wall and a bottom which connects said external and internal side walls, the internal side wall belonging to the casing;

the groove which surrounds the casing front face has approximately a U shaped section, with an external side wall, an internal side wall and a bottom which connects said external and internal side walls, the external side wall comprising inwardly projecting flanges which constitute said additional means of retention, the means of retention secured to the edge of the sleeve being constituted by an approximately J shaped flexible section which is open outwards from the seat back and which has, on the one hand, an internal branch fixed to the edge of the sleeve and, on the other hand, an external branch which hooks itself behind the projecting flanges of the external side wall of the groove.

BRIEF DESCRIPTION OF THE DRAWINGS

Other characteristics and advantages of the invention will appear in the course of the following description of one of its versions, given as a non-restrictive example, by reference to the appended drawings.

On the drawings.

MORE DETAILED DESCRIPTION

Figure 1:
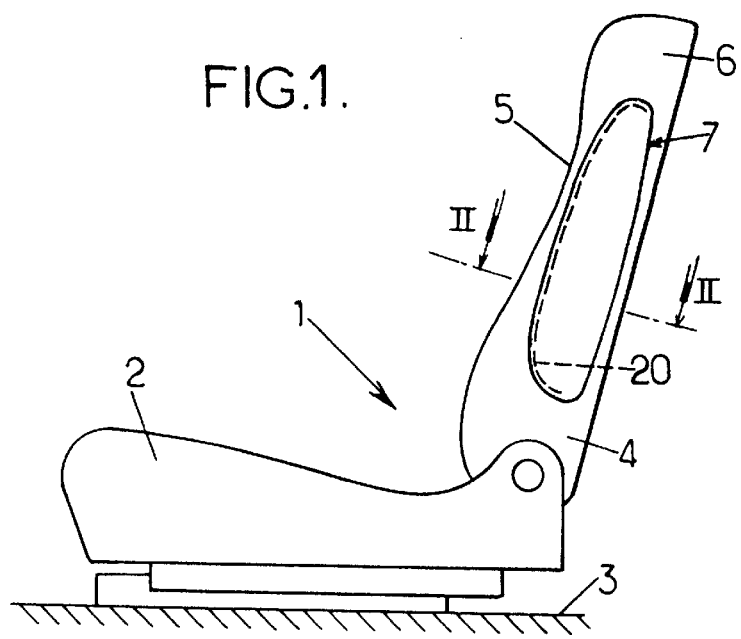
FIG. 1 is a diagram of a seat in accordance with one version of the invention.

FIG. 1 shows an automobile vehicle seat 1 which comprises a seat part 2 mounted on the floor 3 of the vehicle and a seat back 4 mounted on the seat part.

The seat back 4 has a front face 5 which is intended to act as a support for a user's back, and two side edges 6 which flank said front face (only one of these side edges can be seen on FIG. 1).

At least one of the two side edges 6, generally the one of the two side edges which faces outwards from the vehicle, is provided with an airbag safety device 7 which is adapted to inflate its bag (generally by means of a pyrotechnic device) by unfolding it at the user's side when the vehicle sustains a predetermined impact.

Figure 2:
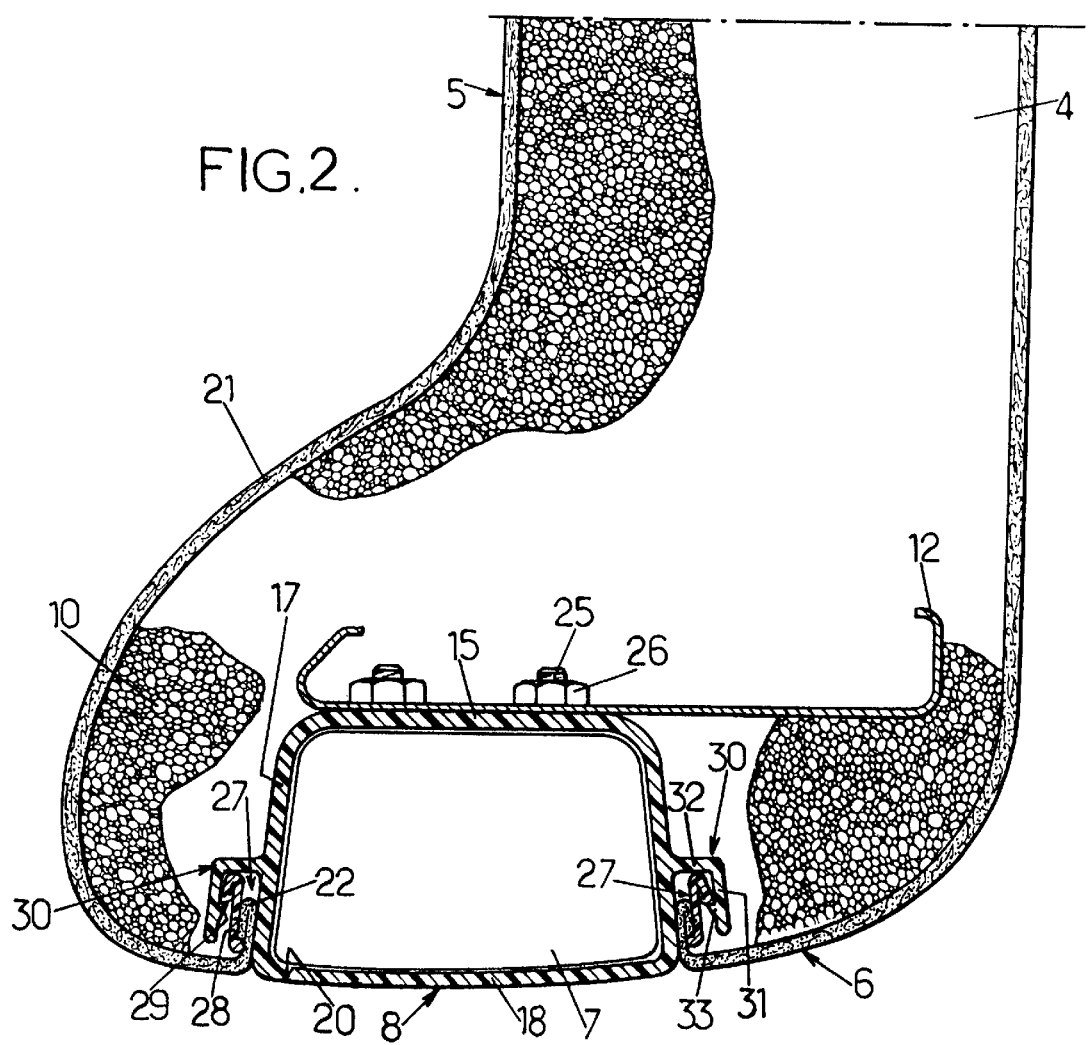
FIG. 2 is a partial horizontal sectional view of the back of the seat shown in FIG. 1, the section being taken in accordance with the II—II line in FIG. 1.

As shown in FIG. 2, the safety device 7 is placed in a closed casing 8, made for example of a plastic material, which is integrated in the synthetic foam padding 10 of the seat back 4.

This casing 8 comprises:

a bottom 15 which is fixed on the metal frame 12 of the seat back, for example by means of screws and nuts 25, 26.

a peripheral side wall 17, and a front wall 18 which is visible on the exterior of the side edge 6 of the seat back.

The front wall 18 of the casing 8 is adapted to open when the safety device bag inflates.

To this end, this front wall 18 can comprise one or more grooves 20 which break during inflation of said bag, this groove possibly for example having a general U shape, with an approximately vertical base and two side branches extending towards the back from said base (see FIG. 1).

Furthermore, the sleeve 21 made of fabric, leather or an alternative, which covers the padding 10 of the seat back, comprises an edge 22 which delimits a cut out section placed to correspond with the casing 8.

Along this peripheral edge 22 is fixed a flexible section made of plastic material 27, with an approximately J shaped section open outwards from the seat back, this section having, on the one hand, an internal branch 28 which is sewn along the edge 22 of the sleeve, and on the other hand, an external elastic branch 29.

This section 27 is inserted with the edge 22 of the sleeve into a peripheral groove 30 which is formed in a single piece with the casing 8 and which has approximately a U shaped section opened at the side outwards from the seat back.

This groove 30 has an external side wall 31, an internal side wall constituted by a portion of the side wall 17 of the casing, and a bottom 32 which connects the external side wall 31 to the side wall 17.

Furthermore, the external side wall 31 is provided with a hooking flange 33 continuous or not, which projects inwards into the groove 30, and behind which the free end of the external branch 29 of the section 27 is hooked.

Preferably, this hooking flange 33 has a front face inclined at an acute angle in relation to the external side wall 31 of the groove, and a back face placed approximately at right angles in relation to the side wall 31 facing the bottom 32 of the groove.

We claim:

1. A vehicle seat comprising a seat back which includes padding supported by a rigid frame and covered by an upholstery sleeve, the seat back having a front face which is intended to act as a support for a user's back and two side edges which flank this front face, said seat back comprising additionally at least one airbag safety device which is adapted to inflate its bag by unfolding it at the user's side when the vehicle sustains a predetermined impact, the safety device being placed in a casing fitted with a peripheral side wall and a casing front face adapted to open when the safety device bag inflates, this casing being integrated into the padding on one of the side edges of the seat back, wherein the upholstery sleeve comprises a cut out section delimited by an edge which belongs to said sleeve and which borders the casing front face of the safety device, with the result that said casing front face is visible on the side edge of the seat back, and wherein the casing front face of the safety device is surrounded by a groove formed in a single piece with the casing, the groove being open at the side outwards from the seat back and comprising an approximately U shaped section with an external side wall having inward projecting flanges, an internal side wall and a bottom which connects said external and internal side walls, and which is integrated into the padding, the edge of the sleeve which borders the casing front face being engaged in said groove and this edge being provided with an approximately J shaped flexible section which is open outwards from the seat back and which has an internal branch fixed to the edge of the sleeve and an external branch which hooks itself behind said projecting flanges.

2. A vehicle seat comprising a seat back which includes padding supported by a rigid frame and covered by an upholstery sleeve, the seat back having a front face which is intended to act as a support for a user's back and two side edges which flank this front face, said seat back comprising additionally at least one airbag safety device which is adapted to inflate its bag by unfolding it at the user's side when the vehicle sustains a predetermined impact, the safety device being placed in a casing fitted with a peripheral side wall and a casing front face adapted to open when the safety device bag inflates, this casing being integrated into the padding on one of the side edges of the seat back, wherein the upholstery sleeve comprises a cut out section delimited by an edge which belongs to said sleeve and which borders the casing front face of the safety device, with the result that said casing front face is visible on the side edge of the seat back, and wherein the casing front face of the safety device is surrounded by a groove formed in a single piece with the casing, the groove being open at the side outwards from the seat back, the groove having an approximately U shaped section with an external side wall, an internal side wall and a bottom which connects said external and internal side walls, and which is integrated into the padding, the edge of the sleeve which borders the casing front face being engaged in said groove and this edge being provided with means of retention which combine with additional means of retention provided in the groove to keep said edge in said groove.

* * * * *